(12) United States Patent
Fukui et al.

(10) Patent No.: US 9,539,836 B2
(45) Date of Patent: Jan. 10, 2017

(54) IMAGE FORMING APPARATUS, IMAGE FORMING METHOD, AND IMAGE-FORMED MATTER

(71) Applicant: DAINIPPON SCREEN MFG. CO., LTD., Kyoto (JP)

(72) Inventors: Tamio Fukui, Kyoto (JP); Masaaki Aoike, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 14/420,616

(22) PCT Filed: Mar. 18, 2013

(86) PCT No.: PCT/JP2013/057647
§ 371 (c)(1),
(2) Date: Feb. 9, 2015

(87) PCT Pub. No.: WO2014/050173
PCT Pub. Date: Apr. 3, 2014

(65) Prior Publication Data
US 2015/0239268 A1    Aug. 27, 2015

(30) Foreign Application Priority Data
Sep. 28, 2012  (JP) .................................. 2012-215942

(51) Int. Cl.
*B41J 2/21* (2006.01)
*B41J 25/00* (2006.01)
(Continued)

(52) U.S. Cl.
CPC ............. *B41J 25/001* (2013.01); *B41J 2/2146* (2013.01); *C09D 11/101* (2013.01); *C09D 11/30* (2013.01)

(58) Field of Classification Search
CPC ............ B41J 2/2146; B41J 2/21; B41J 2/2107
See application file for complete search history.

(56) References Cited

U.S. PATENT DOCUMENTS

2002/0171725 A1* 11/2002 Ouchi .................... C09D 11/40
347/100
2004/0201659 A1   10/2004 Watanabe
(Continued)

FOREIGN PATENT DOCUMENTS

| CN | 1720146 A | 1/2006 |
| CN | 102656018 A | 9/2012 |

(Continued)

OTHER PUBLICATIONS

Notification Concerning Transmittal of International Preliminary Report of Patentability and Notification of Transmittal of Translation of the International Preliminary Report on Patentability issued in International Application No. PCT/JP2013/057647 dated Apr. 9, 2015, with English Translation.
(Continued)

*Primary Examiner* — Geoffrey Mruk
*Assistant Examiner* — Scott A Richmond
(74) *Attorney, Agent, or Firm* — McDermott Will & Emery LLP (57) ABSTRACT

In an inkjet printer where any two ink ejection parts provided upstream and downstream in a conveyance direction of a base member are referred to as first and second ink ejection parts, the first ink ejection part ejects a first ink, a droplet of which when deposited on the base member has a surface tension decreasing with time. The second ink ejection part ejects a second ink, a droplet of which when deposited on the base member has a surface tension that is substantially equal to a surface tension of the droplet of the first ink deposited on a position adjacent to the droplet of the second ink. The printer can therefore make substantially (Continued)

equal the surface tensions of droplets of the first and second inks, deposited on adjacent positions, thus reducing bleeding in a boundary between areas of the inks or variation in the position of the boundary.

12 Claims, 5 Drawing Sheets

(51) Int. Cl.
*C09D 11/101* (2014.01)
*C09D 11/30* (2014.01)

(56) References Cited

U.S. PATENT DOCUMENTS

| | | | |
|---|---|---|---|
| 2005/0168550 A1* | 8/2005 | Deckers | B41J 2/2107 347/100 |
| 2006/0012627 A1 | 1/2006 | Nakazawa et al. | |
| 2008/0213493 A1 | 9/2008 | Mizutani et al. | |
| 2008/0280043 A1* | 11/2008 | Moribe | C09D 11/40 427/256 |
| 2011/0175961 A1* | 7/2011 | Kayahara | B41J 2/2146 347/15 |
| 2012/0154499 A1* | 6/2012 | Mori | H05K 3/1258 347/102 |
| 2012/0262517 A1 | 10/2012 | Takaku et al. | |
| 2012/0281034 A1 | 11/2012 | De Meutter et al. | |

FOREIGN PATENT DOCUMENTS

| | | |
|---|---|---|
| EP | 0588241 A2 | 3/1994 |
| JP | 2003-211641 A | 7/2003 |
| JP | 2004-244624 A | 9/2004 |
| JP | 2005-335280 A | 12/2005 |
| JP | 2006-063322 A | 3/2006 |
| JP | 2007-331171 A | 12/2007 |
| JP | 2008-239964 A | 10/2008 |
| JP | 2010-047686 A | 3/2010 |
| JP | 2010-208037 A | 9/2010 |
| JP | 2011-079952 A | 4/2011 |
| JP | 2011-240659 A | 12/2011 |
| JP | 2012-224658 A | 11/2012 |

OTHER PUBLICATIONS

International Search Report issued in International Application No. PCT/JP2013/057647 with Date of mailing Apr. 16, 2013, with English Translation.

* cited by examiner

IMAGE FORMING APPARATUS, IMAGE FORMING METHOD, AND IMAGE-FORMED MATTER

RELATED APPLICATIONS

This application is a national phase of International Application No. PCT/JP2013/057647, filed on Mar. 18, 2013, which in turn claims the benefit of Japanese Application No. 2012-215942, filed on Sep. 28, 2012, the disclosures of which Applications are incorporated by reference herein.

TECHNICAL FIELD

The present invention relates to a technique for forming an image on a base member and to image-formed matter.

BACKGROUND ART

Inkjet printers have conventionally been used to print an image by ejecting fine droplets of ink from a plurality of ejection ports of a head unit toward printing paper while moving the printing paper relative to the head unit. In recent years, inkjet printers have also been employed to print label stickers. Since label stickers are printed on base members that are not easily impregnated with ink, such as sheets of resin including polyethylene terephthalate (PET) or coated paper, the printing of label stickers uses, for example, ultraviolet (UV) curing ink and cures (fixes) the ink deposited on the base member by irradiation with ultraviolet rays.

Japanese Patent Application Laid-Open No. 2011-79952 (Document 1) discloses an ink set in which, in a surface lifetime region of less than 100 ms after ink landing, the dynamic surface tension of each color ink is higher than or equal to that of a black ink; in a surface lifetime region of 100 to 3000 ms after ink landing, there is a point at which the dynamic surface tension of the black ink is equal to that of each color ink; and in a surface lifetime region at and subsequent to that point, the dynamic surface tension of the black ink is higher than that of each color ink. The ink set disclosed in Document 1 can reduce bleeding on not only plain paper but also paper with poor ink absorbency.

Incidentally, in the case of ejecting a plurality of color inks onto a base member, a first ink ejection part that ejects a first ink of one color and a second ink ejection part that ejects a second ink of another color are arranged in the direction in which the base member is conveyed relative to a head unit. Thus, droplets of the first ink are deposited (lands) on the base member, and then droplets of the second ink are deposited on positions adjacent to the droplets of the first ink after a predetermined period of time has elapsed since the landing of the droplets of the first ink. The method of Document 1, however, fails to take such a time difference into consideration and thus cannot reduce bleeding at a boundary between areas of the first and second inks on the base member or variation in the position of the boundary.

SUMMARY OF INVENTION

The present invention is intended for an image forming apparatus, and it is an object of the present invention to reduce bleeding at a boundary between areas of first and second inks on a base member or variation in the position of the boundary.

The image forming apparatus according to the present invention includes a head unit that ejects a droplet of ink toward a base member, and a movement mechanism for moving the base member relative to the head unit. The head unit includes a first ink ejection part that ejects a first ink, a droplet of which when deposited on the base member has a surface tension that decreases with time, and a second ink ejection part that ejects a second ink and that is provided downstream of the first ink ejection part in a conveyance direction in which the base member is conveyed relative to the head unit. An absolute value of a difference between a surface tension of a droplet of the second ink when deposited on the base member and a surface tension of a droplet of the first ink that has been deposited on a position adjacent to the droplet of the second ink when the droplet of the second ink is deposited on the base member is smaller than an absolute value of a difference between the surface tension of the droplet of the first ink that has been deposited on the position adjacent to the droplet of the second ink when the droplet of the second ink is deposited on the base member and a surface tension of the droplet of the first ink when deposited on the base member.

According to the present invention, it is possible to reduce bleeding at the boundary between areas of the first and second inks on the base member or variation in the position of the boundary.

In a preferred embodiment of the present invention, the surface tension of the droplet of the second ink when deposited on the base member is approximately equal to the surface tension of the droplet of the first ink that has been deposited on the position adjacent to the droplet of the second ink when the droplet of the second ink is deposited on the base member. This makes it possible to further reduce bleeding at the boundary between the areas of the first and second inks on the base member or variation in the position of the boundary.

In one aspect of the present invention, the head unit is capable of changing a distance in the conveyance direction between the first ink ejection part and the second ink ejection part.

In another aspect of the present invention, the image forming apparatus further includes a control part that adjusts a movement speed at which the movement mechanism moves the base member relative to the head unit, to make substantially equal the surface tension of the droplet of the second ink when deposited on the base member and the surface tension of the droplet of the first ink that has been deposited on the position adjacent to the droplet of the second ink when the droplet of the second ink is deposited on the base member.

The present invention is also intended for an image forming method and image-formed matter formed by the image forming method.

These and other objects, features, aspects and advantages of the present invention will become more apparent from the following detailed description of the present invention when taken in conjunction with the accompanying drawings.

DESCRIPTION OF EMBODIMENTS

Figure 1:
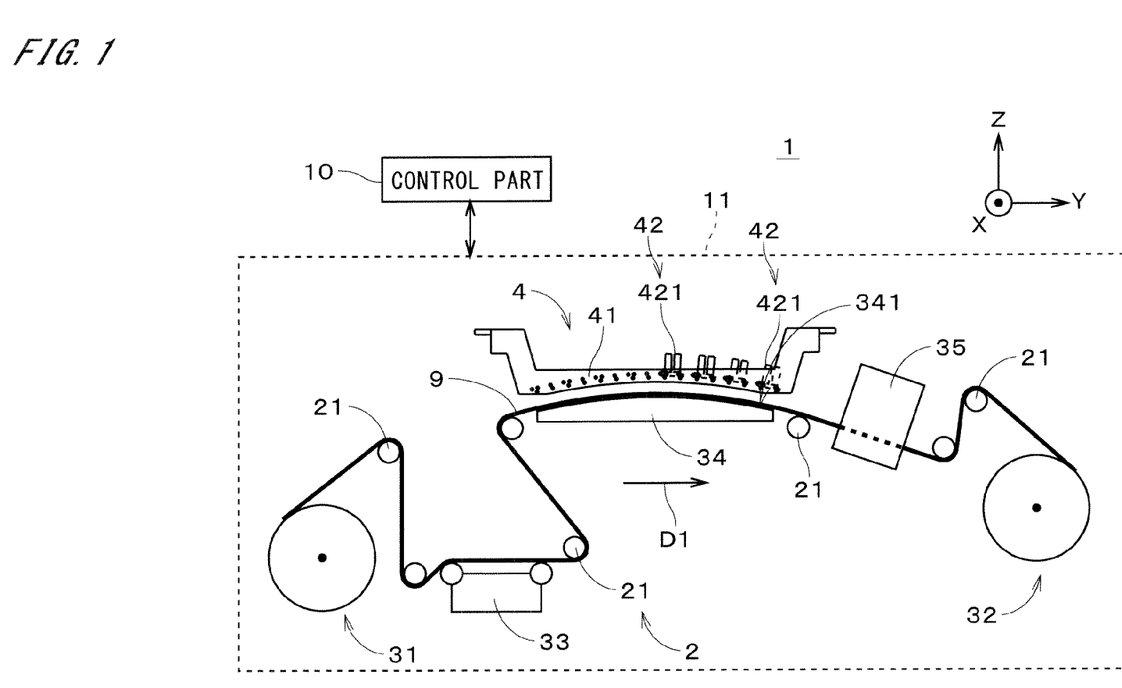
FIG. 1 illustrates a configuration of an inkjet printer.

FIG. 1 illustrates a configuration of an inkjet printer 1 according to an embodiment of the present invention. The inkjet printer 1 is an image forming apparatus for forming an image on a base member 9 that is in continuous sheet form, such as a sheet of resin including polyethylene terephthalate (PET) or long coated paper, by ejecting droplets (fine droplets) of inks toward the base member 9. In FIG. 1, two horizontal directions perpendicular to each other are given as X and Y directions, and a vertical direction perpendicular to the X and Y directions is given as a Z direction. The X and Y directions in FIG. 1 are, not necessarily in the horizontal direction. Similarly, the Z direction is not necessarily in the vertical direction.

The inkjet printer 1 in FIG. 1 includes a main body 11 and a control part 10. The main body 11 includes a movement mechanism 2 for moving the base member 9 that is in sheet form, and a head unit 4 that ejects droplets of UV curing ink toward the base member 9 that is being moved by the movement mechanism 2. The movement mechanism 2 includes a plurality of rollers 21 that are each long in the X direction in FIG. 1. In the vicinity of the roller 21 that is disposed furthest to the −Y side is a supply part 31 that holds a roll (supply roll) of the base member 9. In the vicinity of the roller 21 that is disposed furthest to the Y side is a taking-up part 32 that holds a roll (taken-up roll) of the base member 9. In the inkjet printer 1, some of the rollers 21 of the movement mechanism 2 rotate at a constant rotational speed about an axis parallel to the X direction so that the base member 9 moves at a constant speed along a predetermined travel path from the supply part 31 to the taking-up part 32.

On the travel path of the base member 9, a base-member guiding part 34 is provided at a position facing the head unit 4. The base-member guiding part 34 has a curved surface 341 (hereinafter, referred to as a "guideway 341") that is part of a cylindrical surface located directly under the head unit 4 (on the −Z side) and centered on a virtual axis parallel to the X direction. The base member 9 moves along the smooth guideway 341 under the head unit 4. The base member 9 moves in approximately a direction indicated by an arrow D1 in FIG. 1 (a direction parallel to the Y direction) at the position facing the head unit 4. This direction D1 is thus referred to as a "conveyance direction" in the following description.

On the travel path of the base member 9, a skew correction part 33 that corrects skewing of the base member 9 is provided between the supply part 31 and the base-member guiding part 34, and a curing part 35 that irradiates the base member 9 with ultraviolet rays for curing ink is provided between the base-member guiding part 34 and the taking-up part 32. Note that the inkjet printer 1 may also include other constituent elements such as a pre-processing part that performs predetermined pre-processing on the base member 9.

The head unit 4 includes a plurality of head assemblies 42 that have heads 421, and a base 41 that supports the plurality of head assemblies 42. The head assemblies 42, which serve as ink ejection parts, are each long in the X direction and are arranged in approximately the Y direction (to be precise, along the guideway 341). The head unit 4 includes four head assemblies 42 that respectively eject black (K), cyan (C), magenta (M), and yellow (Y) inks in the +Y direction from the −Y side. Alternatively, the head unit 4 may be configured to eject other types of ink, such as an invisible ink.

Figure 2:
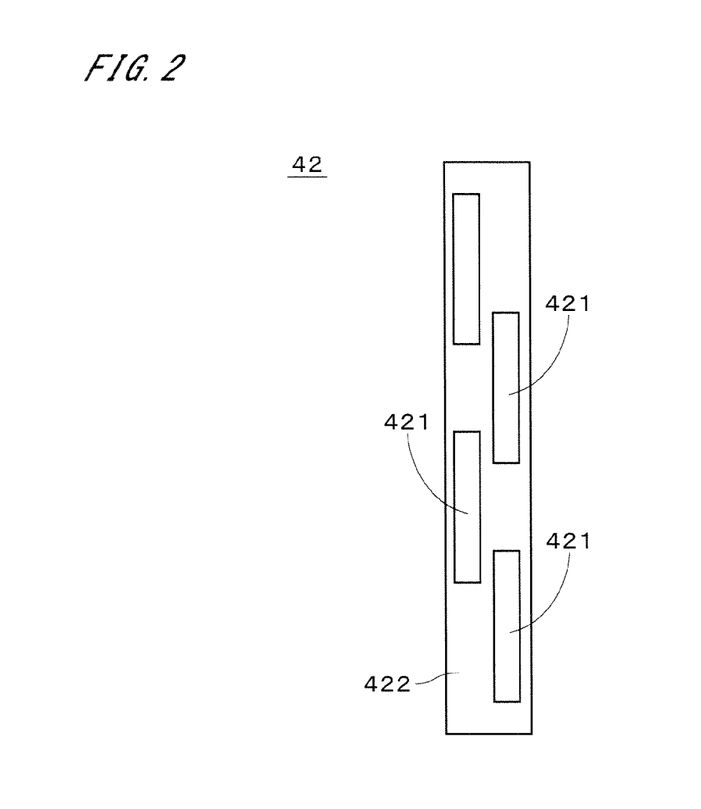
FIG. 2 is a plan view of a head assembly.
Figure 3:
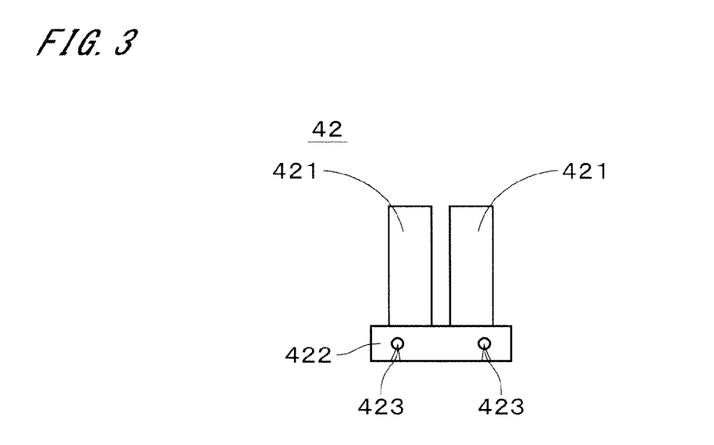
FIG. 3 is a front view of the head assembly.

FIG. 2 is a plan view of one head assembly 42, and FIG. 3 is a front view of the head assembly 42. The following description focuses on this head assembly 42 that ejects a color ink, but it is to be noted that the other head assemblies 42 also have the same configuration. As will be described later, the head assembly 42 illustrated in FIGS. 2 and 3 is fixed to the base 41 in a position inclined at a slight rotation angle about an axis parallel to the length of the head assembly 42. Strictly speaking, the lateral direction in FIG. 2 does not agree with that in FIG. 1, and the longitudinal and lateral directions in FIG. 3 also do not agree with those in FIG. 1.

The head assembly 42 includes a head fixing block 422 in the shape of a rectangular parallelepiped that extends in one direction, and a plurality of (in the present embodiment, four) heads 421 that extend in the same direction as the length of the head fixing block 422. Each head 421 has a plurality of ejection ports arranged along its length (this direction is hereinafter referred to as an "arrangement direction"). The head fixing block 422 has a plurality of through holes formed in a staggered configuration along its length, and the plurality of heads 421 are respectively inserted into and fixed to the plurality of through holes. The head assembly 42 has a large number of ejection ports formed at approximately a fixed pitch across its entire length that ranges from the vicinity of one end of the head fixing block 422 to the vicinity of the other end thereof. The head fixing block 422 has two screw holes 423 in each end surface in its longitudinal direction (i.e., end surface orthogonal to the longitudinal direction). The head fixing block 422 is made of, for example, a metal such as stainless steel. Alternatively, the head assembly 42 may have attached thereto only a single head 421 that extends from the vicinity of one end of the head fixing block 422 to the vicinity of the other end thereof. In other words, the head fixing block 422 has at least one head 421 attached thereto.

Figure 4:
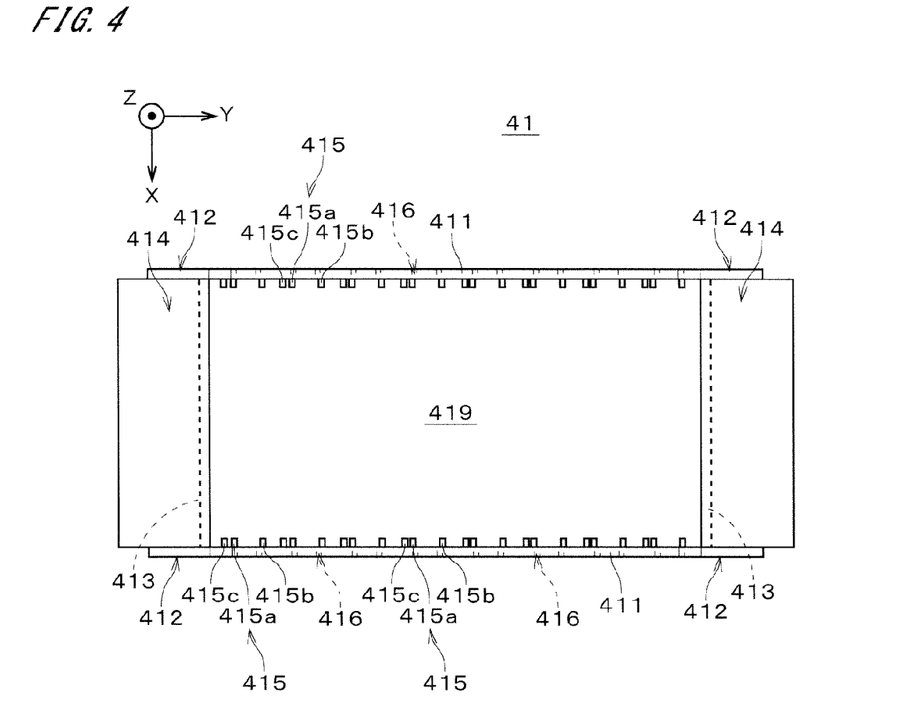
FIG. 4 is a plan view of a base.
Figure 5:
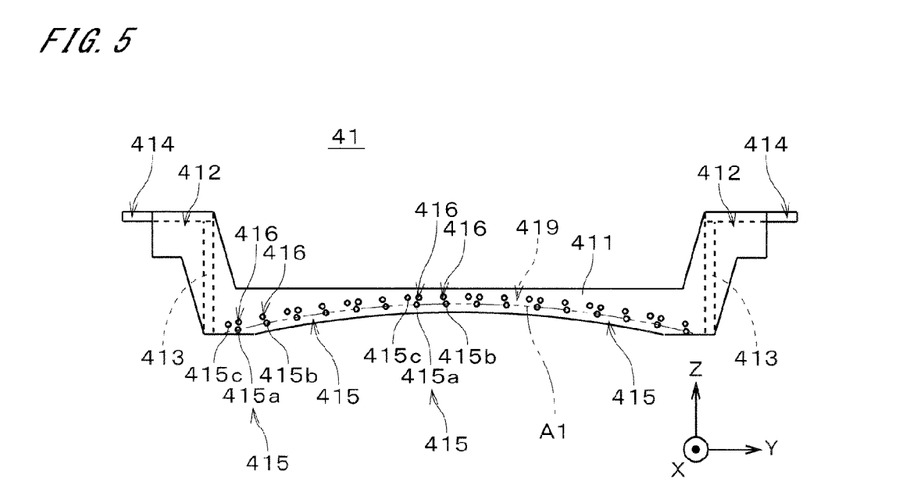
FIG. 5 is a front view of the base.

FIG. 4 is a plan view of the base 41, and FIG. 5 is a front view of the base 41. The base 41 has two fixed plates 411 that are each long in the Y direction in FIG. 4 and that are spaced from each other in the X direction. Each fixed plate 411 has a portion 412 (hereinafter, referred to as a "connecting portion 412") that bends in approximately the +Z direction, at each end in the Y direction in FIG. 5. As illustrated in FIG. 4, opposed connecting portions 412 of the two fixed plates 411 (i.e., two connecting portions 412 on either the +Y or −Y side) are fixed to a coupling plate 413 that is long in the X direction. The base 41 thus has an opening 419 that is surrounded by the two fixed plates 411 and the two coupling plates 413. Each coupling plate 413 has a portion 414 (hereinafter, referred to as an "attachment portion 414") that bends outward in the Y direction (on the side opposite the opening 419), at its end on the Z side. The inkjet printer 1 in FIG. 1 supports the head unit 4 by attaching these attachment portions 414 to support parts (not shown). The fixed plates 411 and the coupling plates 413 are made of, for example, a metal such as stainless steel.

Each fixed plate 411 in FIG. 5 has a plurality of (in FIG. 5, eight) positioning parts 415 arranged at equal intervals along an arc (indicated by a dashed double-dotted line A1 in FIG. 5) centered on a virtual axis that is directly under the base 41 (on the −Z side) and parallel to the X direction. Each positioning part 415 includes three positioning pins 415a, 415b, and 415c. As will be described later, each positioning part 415 can fix the head fixing block 422 of a single head assembly 42, and thus the position of each positioning part 415 can be regarded as a fixing position at which the head fixing block 422 is fixed. The base 41 has a plurality of (in the present embodiment, eight) fixing positions at fixed intervals (hereinafter referred to as "intervals of fixing positions") along the arc A1. The −Z-side edges of the fixed plates 411 (except opposite end portions in the Y direction) are arc-shaped along the are A1. In other words, the bottom surface of the base 41 is curved to the +Z side in a concave shape. Each fixed plate 411 further has a plurality of through holes 416 formed along the are A1.

In the ease of assembling the head unit 4 in FIG. 1, fixing positions of the plurality of head assemblies 42 to be used are determined, and the head assemblies 42 are disposed at their fixing positions. At this time, the position and orientation of each head assembly 42 are adjusted by bringing the bottom surface (surface facing downward in FIG. 3) of the head fixing block 422 of the head assembly 42 into contact with two positioning pins 415a and 415b and bringing one longitudinal side surface of the head fixing block 422 (surface facing toward the left in FIG. 3) into contact with one positioning pin 415c. This allows the direction of arrangement of a plurality of ejection ports of each head 421, which is attached to the head assembly 42, to be parallel to the aforementioned virtual axis, and accordingly allows an ejection surface in which the ejection ports are arranged to be approximately parallel to a cylindrical surface that includes the arcs A1 on the two fixed plates 411. Note that the above-described configuration of the positioning parts 415 is merely one example, and for example, each positioning part 415 may include other members, such as a member that engages with a notch portion having a predetermined shape and formed in the head fixing block 422.

In actuality, the head assemblies 42 are fixed to the fixed plates 411 by fastening screws into the screw holes 423 (see FIG. 3) of the head assemblies 42 via the through holes 416 (see FIG. 5) of the fixed plates 411 in a state in which the positions and orientations of the head assemblies 42 have been adjusted. Note that the through holes 416 have a diameter larger than that of the screws. In the present embodiment, the head assembly 42 that ejects the black ink, the head assembly 42 that ejects the cyan ink, the head assembly 42 that ejects the magenta ink, and the head assembly 42 that ejects the yellow ink are arranged at four successive fixing positions and arrayed at intervals of the fixing positions along the guideway 341 (or the arc A1).

The assembled head unit 4 is disposed at a position facing the guideway 341 of the base-member guiding part 34 in FIG. 1 and attached to a support part. At this time, by making the virtual axis of the arcs A1 on the fixed plates 411 and the virtual axis of the guideway 341 of the base-member guiding part 34 coincide, the ejection surfaces of the heads 421 of the head assemblies 42 become approximately parallel to the guideway 341, and the arrangement direction of the ejection ports of the heads 421 becomes perpendicular to the conveyance direction of the base member 9 (parallel to the virtual axes).

Accordingly, in the case of forming an image with the head unit 4, the ejection surfaces of the heads 421 of the head assemblies 42 are approximately parallel to the main surface of the base member 9 on the guideway 341 (i.e., the heads 421 are in an upright position relative to the base member 9), and droplets of ink are ejected approximately perpendicular to the main surface from the ejection ports. In actuality, the end surface of the head unit 4 that faces the base member 9 (i.e., the −Z-side end surfaces of the fixed plates 411) has a shape following the shape of the guideway 341. It is thus possible to dispose the head unit 4 such that this end surface is in close proximity to the main surface of the base member 9, and accordingly, the ejection surfaces of the heads 421 are in close proximity to the main surface of the base member 9.

Figure 6:
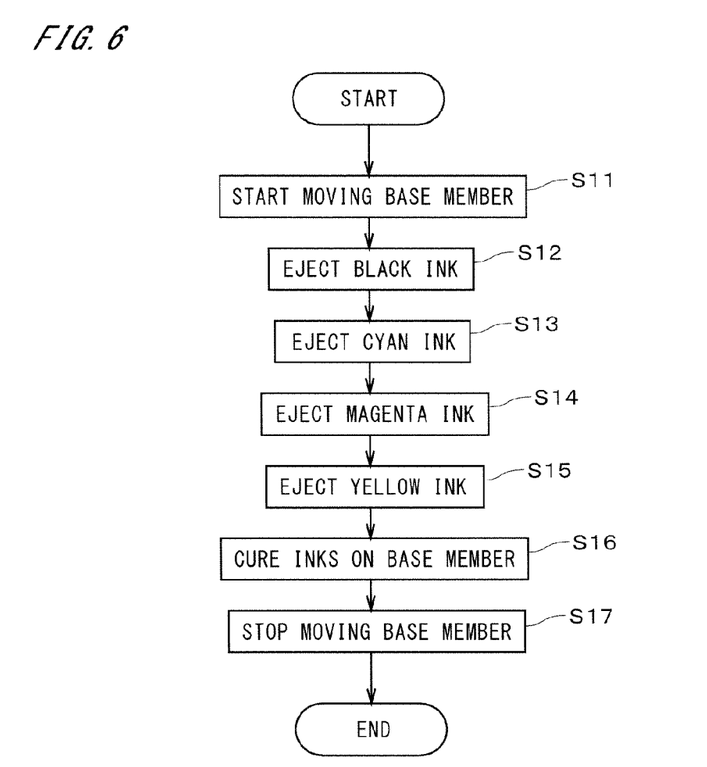
FIG. 6 is a flowchart of processing for forming an image on a base member.

FIG. 6 is a flowchart of processing performed by the inkjet printer 1 when forming an image on the base member 9. Steps S12 to S16 in FIG. 6 show processing performed on one portion of the base member 9, but in actuality, the processing of steps S12 to S16 is performed in parallel on a plurality of portions of the base member 9.

In the image forming processing performed by the inkjet printer 1, when the movement of the base member 9 is started (step S11), continuous portions of the base member 9 are sequentially pulled out of the supply part 31 in FIG. 1, and each of the portions (hereinafter, referred to as a "target portion") passes through the skew correction part 33 and arrives at the base-member guiding part 34. In the base-member guiding part 34, the target portion moves in the conveyance direction while being in contact with the guideway 341. In parallel with this movement of the base member 9, the head unit 4 that faces the base-member guiding part 34 forms an image on the target portion.

Specifically, when the target portion has arrived at a position that faces the head assembly 42 that ejects the black ink, droplets of the black ink are ejected toward the target portion to form a black image (step S12). The target portion, which is successively moving, then arrives at a position that faces the head assembly 42 that ejects the cyan ink after a predetermined period of time has elapsed since the deposition (landing) of the black ink, and droplets of the cyan ink are ejected toward the target portion to form a cyan image (step S13). Similarly, the target portion arrives at a position that faces the head assembly 42 that ejects the magenta ink after a predetermined period of time has elapsed since the deposition of the cyan ink, and droplets of the magenta ink are ejected toward the target portion to form a magenta image (step S14). The target portion further arrives at a position that faces the head assembly 42 that ejects the yellow ink after a predetermined period of time has elapsed since the deposition of the magenta ink, and droplets of the yellow ink are ejected toward the target portion to form a yellow image (step S15).

Such wet-on-wet printing is performed in this way, and the target portion moves to the curing part 35 with the black, cyan, magenta, and yellow inks on its surface remaining substantially in the form of a liquid layer. The target portion is then irradiated with ultraviolet rays to collectively cure the black, cyan, magenta, and yellow inks (step S16) and is taken up by the taking-up part 32. When the entire image is formed on the base member 9, the movement of the base member 9 is stopped to end the image forming processing (step S17).

As described previously, each head assembly 42 has the ejection ports arranged across the entire width of an image forming area of the base member 9, the width being orthogonal to the conveyance direction. This enables so-called one-pass (single-pass) printing in which image formation is completed through only one pass of the base member 9 under the head unit 4, thus making it possible to complete the image formation in a short time. The base member 9 with the image formed thereon is used as various types of printed matter (image-formed matter).

Figure 7:
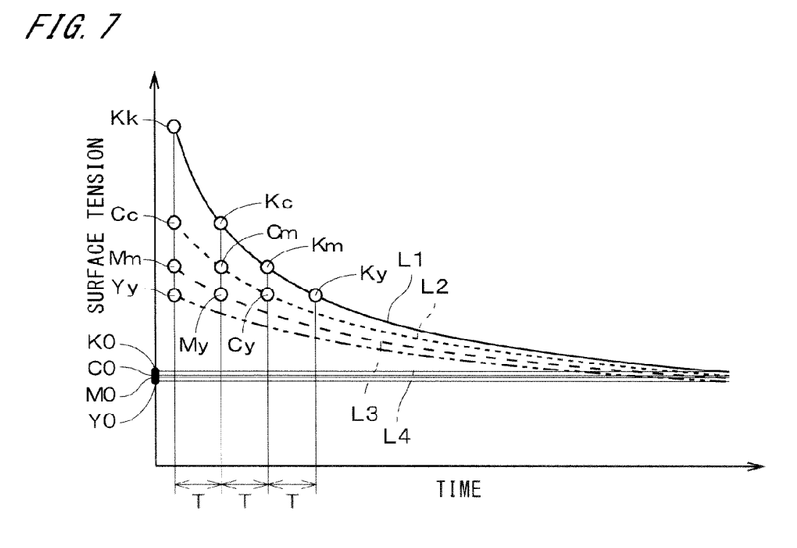
FIG. 7 illustrates changes in surface tension of inks.

Here, changes in the surface tension of droplets of the black, cyan, magenta, and yellow inks used in the inkjet printer 1 will be described. FIG. 7 illustrates changes in the surface tension (i.e., dynamic surface tension characteristics) of droplets of the black, cyan, magenta, and yellow inks deposited on the base member 9. The changes in the surface tension of the black, cyan, magenta, and yellow inks are respectively indicated by lines denoted by reference numerals L1, L2, L3, and L4 in FIG. 7. The black, cyan, magenta, and yellow inks that have changes in surface tension as illustrated in FIG. 7 are produced by preparing black, cyan, magenta, and yellow inks that have approximately the same surface tension in an equilibrium state (this surface tension is hereinafter referred to as a "static surface tension") and adjusting the amount (e.g., several percent) of a surface conditioner such as an acrylic surface conditioner added to each ink. The black, cyan, magenta; and yellow inks having UV curability in the present embodiment contain, in addition to such a surface conditioner, a monofunctional monomer, a multifunctional monomer, pigment dispersion (pigment), a pigment dispersant, a photo-polymerization initiator, a sensitizer, or a polymerization inhibitor, for example. Normally, the dynamic surface tension characteristics change in various ways depending on the types and compounding ratio of these components, but the addition of the surface conditioner enables the dynamic surface tension characteristics to be adjusted within a range of a certain size.

As illustrated in FIG. 7, the surface tension of droplets of the black ink decreases with time from a surface tension $Kk$ (hereinafter, referred to as an "initial surface tension $Kk$"; the same applies to all the other inks) of the black ink when deposited on the base member 9 to a static surface tension $K0$ of the black ink in an equilibrium state, and the surface tension of droplets of the cyan ink decreases with time from an initial surface tension $Cc$ thereof when deposited on the base member 9 to a static surface tension $C0$ thereof in an equilibrium state. Similarly, the surface tension of droplets of the magenta ink decreases with time from an initial surface tension $Mm$ thereof when deposited on the base member 9 to a static surface tension $M0$ thereof in an equilibrium state, and the surface tension of droplets of the yellow ink decreases with time from an initial surface tension $Yy$ thereof when deposited on the base member 9 to a static surface tension $Y0$ thereof in an equilibrium state. In FIG. 7, reference characters attached to white dots indicate surface tension values for these dots.

The inkjet printer 1 of the present embodiment has the four head assemblies 42 that are arranged at equal intervals of the fixing positions along the guideway 341 and respectively eject black, cyan, magenta, and yellow inks. Thus, the amount of time from when droplets of the black ink are deposited on a target portion to when droplets of the cyan ink are deposited on the target position (i.e., a difference in ejection time between the black ink and the cyan ink), the amount of time from when the droplets of the cyan ink are deposited on the target portion to when droplets of the magenta ink are deposited on the target portion, and the amount of time from when the droplets of the magenta ink are deposited on the target portion to when droplets of the yellow ink are deposited on the target potion are all the same amount of time T.

In the inkjet printer 1, the initial surface tension $Cc$ of the cyan ink is a value between the initial surface tension $Kk$ and the static surface tension $K0$ of the black ink. Then, the dynamic surface tension characteristics of the cyan ink and the black ink are adjusted to reduce the absolute value of a difference between the initial surface tension $Cc$ of the cyan ink and the surface tension $Kc$ of droplets of the black ink when the amount of time T has elapsed since the deposition on the target portion, i.e., the absolute value of a difference (hereinafter, also referred to as a "surface tension difference between adjacent inks") between the surface tension $Cc$ (initial surface tension $Cc$) of the droplet of the cyan ink when deposited on the target portion and the surface tension $Kc$ of the droplet of the black ink that has been deposited on a position adjacent to the droplet of the cyan ink when the droplet of the cyan ink is deposited on the target portion. In the present embodiment, the surface tension $Kc$ of the droplet of the black ink when the amount of time T has elapsed since deposition of the black ink on the target portion is approximately equal to the initial surface tension $Cc$ of the cyan ink. The surface tension difference between adjacent inks is preferably 10% or less of the initial surface tension $Cc$ of the cyan ink, and more preferably 5% or less thereof.

The initial surface tension $Mm$ of the magenta ink and the initial surface tension $Yy$ of the yellow ink are also values between the initial surface tension $Kk$ and the static surface tension $K0$ of the black ink. The surface tension $Km$ of the droplets of the black ink when an amount of time $2T$ has elapsed since deposition of the black ink on the target portion, i.e., the surface tension $Km$ of the droplets of the black ink on the target portion when droplets of the magenta ink are deposited on the target portion, is approximately equal to the initial surface tension $Mm$ of the magenta ink. Also, the surface tension $Ky$ of the droplets of the black ink when an amount of time $3T$ has elapsed since deposition of the black ink on the target portion, i.e., the surface tensions $Ky$ of the droplets of the black ink on the target portion when droplets of the yellow ink are deposited on the target portion, is approximately equal to the initial surface tension $Yy$ of the yellow ink.

Similarly, the initial surface tension $Mm$ of the magenta ink and the initial surface tension $Yy$ of the yellow ink are within a range between the initial surface tension $Cc$ and the static surface tension $C0$ of the cyan ink. The surface tension $Cm$ of the droplets of the cyan ink when the amount of time T has elapsed since deposition of the cyan ink on the target portion is approximately equal to the initial surface tension $Mm$ of the magenta ink, and the surface tension $Cy$ of the droplets of the cyan ink when the amount of time $2T$ has elapsed since deposition of the cyan ink on the target portion is approximately equal to the initial surface tension $Yy$ of the yellow ink. Also, the initial surface tension $Yy$ of the yellow ink is within a range between the initial surface tension $Mm$ and the static surface tension $M0$ of the magenta ink, and the surface tension $My$ of the droplets of the magenta ink when the amount of time T has elapsed since deposition of the magenta ink on the target portion is approximately equal to the initial surface tension $Yy$ of the yellow ink.

In this way, the dynamic surface tension characteristics (changes in surface tension) of inks are adjusted according to differences in ejection times among the inks to the target potion of the base member 9, such that the surface tension of the droplets of each color ink when deposited on the target portion is approximately equal to the surface tension of droplets of the other color inks that have already been ejected onto the target portion and deposited on a position adjacent to the droplets of the color ink. Note that the differences in ejection times among the inks depend on the intervals of the head assemblies 42 and the speed at which the movement mechanism 2 moves the base member 9. It is of course possible to employ different intervals between the black head assembly 42 and the cyan head assembly 42, between the cyan head assembly 42 and the magenta head assembly 42, and between the magenta head assembly 42 and the yellow head assembly 42, or to change the intervals of the head assemblies 42 or allow the control part 10 to adjust the movement speed of the base member 9 according to the dynamic surface tension characteristics of the black, cyan, magenta, and yellow inks, to produce differences in ejection times such that different color inks deposited at adjacent positions have substantially the same surface tension.

Figure 8:
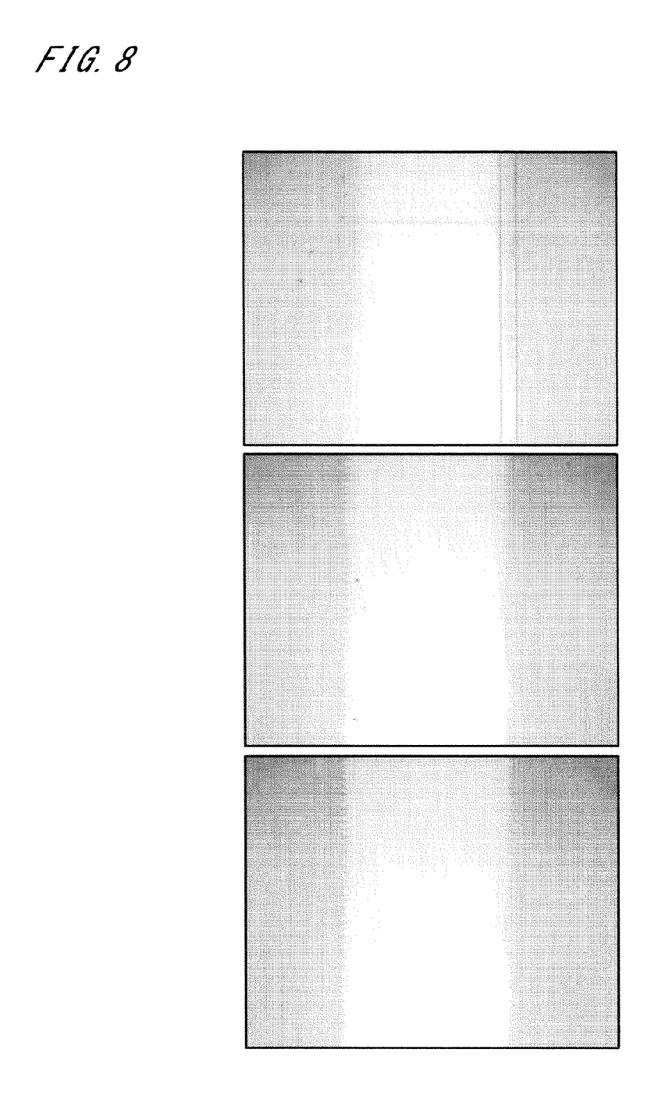
FIG. 8 illustrates an image formed on the base member.

FIG. 8 illustrates parts of images formed on the base member 9. The upper, middle, and lower sections of FIG. 8 illustrate images produced by forming a pattern including a hand-like space with one color ink and then forming a band-like pattern on that space with another color ink. Specifically, the images in the upper, middle, and lower sections of FIG. 8 are formed by first applying the magenta ink at a density of 100% (so-called "solid density") to areas on the opposite sides of the space to form a 1-millimeter (mm)-wide band-like space, and then, when a set amount of time has elapsed since the application of the magenta ink, applying the yellow ink at a density of 100% onto that space to form a 1-mm-wide hand-like pattern.

The set amount of time used in forming the middle-section image in FIG. 8 is longer than the amount of time T illustrated in FIG. 7, and accordingly the surface tension of droplets of the yellow ink when deposited on the base member 9 is higher than the surface tension of droplets of the magenta ink deposited at a position adjacent to the droplets of the yellow ink. In this case, the magenta ink having a relatively low surface tension encroaches upon the area of the yellow ink having a relatively high surface tension. This produces a large amount of bleeding at the boundary between the areas of the magenta and yellow inks on the base member 9 in the middle-section image in FIG. 8, and also causes the position of the boundary to move toward the center of the band-like pattern, thus reducing the width of the pattern formed with the yellow ink to less than 1 mm. The set amount of time used in forming the upper-section image in FIG. 8 is even longer than the set amount of time used in forming the middle-section image in FIG. 8, and accordingly a difference between the surface tension of droplets of the yellow ink when deposited on the base member 9 and the surface tension of droplets of the magenta ink that has been deposited on a position adjacent to the droplet of the yellow ink is greater than in the case of the middle-section image in FIG. 8. This produces a larger amount of bleeding at the boundary between the areas of the magenta and yellow inks in the upper-section image in FIG. 8 than in the middle-section image in FIG. 8, and further reduces the width of the pattern formed with the yellow ink.

On the other hand, the set amount of time used in forming the lower-section image in FIG. 8 is equal to the amount of time T illustrated in FIG. 7, and accordingly the surface tension of droplets of the yellow ink when deposited on the base member 9 is approximately equal to the surface tension of droplets of the magenta ink deposited on a position adjacent to the droplets of the yellow ink. The lower-section image in FIG. 8 has a smaller amount of bleeding at the boundary between the areas of the magenta and yellow inks and smaller variation in the position of the boundary than the upper- and middle-section images in FIG. 8, allowing a pattern formed with the yellow ink to have a width of approximately 1 mm.

Here, an inkjet printer according to a comparative example will be described. The inkjet printer in the comparative example includes a ultraviolet-ray irradiator that irradiates a base member with ultraviolet rays and is provided in the vicinity downstream of each head assembly in the conveyance direction (between each pair of adjacent head assemblies). This inkjet printer uses ordinary black, cyan, magenta, and yellow inks, and the surface tension greatly differs among droplets of the different color inks deposited on adjacent positions. The other constituent elements are the same as those of the inkjet printer 1 in FIG. 1.

In the inkjet printer of the comparative example, the ink ejected from each head assembly onto a base member is cured with ultraviolet rays emitted from the ultraviolet-ray irradiator before another ink is ejected from another head assembly located downstream of the head assembly. Accordingly, problems such as variation in the position of the boundary due to a difference in surface tension among inks deposited on adjacent positions do not occur. There are certain limits to accuracy with which an inkjet printer that performs one-pass printing can convey the base member, thus easily causing the base member to become skewed or move in an oblique direction, and producing color shifts or streak unevenness in an image formed on the base member. If the distance between the head assemblies of the head unit is narrowed to reduce occurrence of color shifts or streak unevenness due to skewing or oblique motion of the base member, it becomes difficult to provide ultraviolet-ray irradiators between head assemblies in the inkjet printer of the comparative example. It is thus extremely difficult for the inkjet printer of the comparative example to reduce the occurrence of color shifts or streak unevenness while reducing, for example, variation in the position of the boundary between different color inks.

In contrast, in the inkjet printer 1 in which the ink ejection parts (head assemblies 42) are arranged in the conveyance direction of the base member 9 relative to the head unit 4 and any two of the ink ejection parts that are provided upstream and downstream in the conveyance direction are respectively referred to as a first ink ejection part and a second ink ejection part, the first ink ejection part ejects a first ink, droplets of which when deposited on the base member 9 has a surface tension that decreases with time until the droplets enter the equilibrium state. Moreover, the second ink ejection part ejects a second ink, droplets of which when deposited on the base member 9 has a surface tension that is approximately equal to the surface tension of the droplets of the first ink that has been deposited on a position adjacent to the droplets of the second ink. This makes it possible to make the surface tension of droplets of the first and second inks that are deposited on adjacent positions substantially equal and to reduce bleeding at the boundary between the areas of the first and second inks on the base member 9 or variation in the position of the boundary. Consequently, it is possible to reduce the distance between the ink ejection parts of the head unit 4 to as short as possible to reduce occurrence of color shifts or streak unevenness and to improve the quality of image-formed matter (printed matter) produced by the inkjet printer 1.

The inkjet printer 1 according to the present embodiment has the four ink ejection parts that are arranged in the conveyance direction of the base member 9 and respectively eject the black, cyan, magenta, and yellow inks. For each combination of two of the four ink ejection parts, the surface tension of droplets of one ink when ejected from one ink ejection part located downstream in the conveyance direction and deposited on the base member 9 is approximately equal to the surface tension of droplets of another ink that has been ejected in advance from the other ink ejection part located upstream in the conveyance direction and deposited on a position adjacent to the droplets of the one ink. This reduces bleeding at the boundaries of areas of the black, cyan, magenta, and yellow inks on the base member 9 or variations in the positions of the boundaries. It is of course possible for the inkjet printer 1 to use only two or three color inks or use five or more color inks.

In the head unit 4, the ink ejection parts (head assemblies 42) can be fixed at any positions of a plurality of fixing positions on the base 41, and the distance between any pair of ink ejection parts in the conveyance direction (to be precise, in the direction along the guideway 341) can be changed. For example, in the case where the conveying speed of the base member 9 is doubled to increase the speed of image formation, the distance between each pair of adjacent ink ejection parts in the head unit 4 may be doubled to enable printing with smaller amounts of bleeding at the boundaries of different color inks and smaller variations in the positions of the boundaries without changing inks. In this case, driving frequencies of the heads 421 may be changed. Also, in the ease where inks are changed, the distance between each pair of adjacent ink ejection parts may be changed according to the dynamic surface tension characteristics of the inks. In this way, the inkjet printer 1, which appropriately changes the conveying speed of the base member 9 or the distance between each pair of ink ejection parts according to the dynamic surface tension characteristics of the color inks, can easily make the surface tension of droplets of the first and second inks deposited on adjacent positions substantially equal.

While the above has been a description of an embodiment of the present invention, the present invention is not intended to be limited to the embodiment described above and can be modified in various ways.

As described previously, from the viewpoint of reducing bleeding at the boundary between the areas of the first and second inks or variation in the position of the boundary, it is important to reduce the surface tension difference between adjacent inks, which is the absolute value of the difference between the surface tension of droplets of the second ink when deposited on the base member 9 and the surface tension of droplets of the first ink deposited on a position adjacent to the droplet of the second ink when the droplets of the second ink are deposited on the base member 9, to as small as possible within an available range. In this case, the surface tension difference between adjacent inks is smaller than the amount of decrease in the surface tension of the droplets of the first ink within a time difference between the ejection times of the first and second inks, i.e., the absolute value of the difference between the surface tension of the droplets of the first ink when deposited on the base member 9 and the surface tension of the droplets of the first ink that has been deposited on the position adjacent to the droplets of the second ink when the droplets of the second ink are deposited on the base member 9. This makes is possible to reduce, to some extent, bleeding at the boundary between the areas of the first and second inks on the base member 9 or variation in the position of the boundary. The surface tension difference between adjacent inks is preferably one half or less of the above-described amount of decrease in the surface tension, more preferably, one third or less of the above-described amount of decrease in the surface tension.

The head unit 4 according to the above-described embodiment is merely one example, and the head unit 4 that is capable of changing the distance between two ink ejection parts in the conveyance direction of the base member 9 may have other configurations.

Depending on the design, the inkjet printer 1 may be provided with a movement mechanism for moving the head unit 4 in the conveyance direction. In other words, the movement mechanism provided in the inkjet printer 1 may be a mechanism for moving either the base member 9 or the head unit 4 relative to each other in a predetermined conveyance direction.

The inkjet printer may be configured to form an image on a base member that is in a sheet form. For example, in an inkjet printer that holds a base member on a stage, a head unit moves relative to the base member in a conveyance direction parallel to the stage (main scanning) while ejecting ink, then moves relative to the base member by a predetermined distance in a width direction that is parallel to the stage and perpendicular to the conveyance direction after having arrived at the end of the base member (sub-scanning), and then moves relative to the base member in a direction opposite to the direction of the previous main scanning while ejecting inks. In this way, the above-described inkjet printer (so-called "shuttle type printer") forms an image on the entire base member by the head unit performing main scanning on the base member in the conveyance direction (straight conveyance direction) and intermittently performing sub-scanning in the width direction each time the main scanning is completed.

The inkjet printer 1 may use water-based ink, for example. The inkjet printer 1 may use ink that is cured by being irradiated with radiation other than UV rays (e.g., infrared rays or electron rays). In this case, the inkjet printer 1 uses a curing part that irradiates the base member 9 with radiation for curing ink.

The inkjet printer 1 may form an image on plate- or sheet-form base members that are made of materials other than paper or resins. Variation in the position of the boundary of ink or the like due to a difference in surface tension can easily occur particularly with base members that are not easily impregnated with ink (i.e. base members that are impervious to ink). Accordingly, the inkjet printer 1 that is capable of reducing bleeding at the boundary between the areas of the first and second inks or variation in the position of the boundary is particularly suited to forming images on base members that are not easily impregnated with inks. Examples of such base members include base members made of plastics such as PET, glass, or a metal, and base members (e.g., coated paper) that include surface layers that are impervious to inks.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1 Inkjet printer
2 Movement mechanism
4 Head unit
9 Base member
10 Control part
35 Curing part
42 Head assembly
S11-S17 Step

The invention claimed is:

1. An image forming apparatus comprising:
a head unit that ejects a droplet of ink toward a base member; and
a movement mechanism for moving said base member relative to said head unit, wherein said head unit includes:
a first ink ejection part that ejects a first ink, a droplet of which when deposited on said base member has a dynamic surface tension that decreases with time; and
a second ink ejection part that ejects a second ink, a droplet of which when deposited on said base member has a dynamic surface tension that decreases with time, said second ink ejection part being provided downstream of said first ink ejection part in a conveyance direction in which said base member is conveyed relative to said head unit, said first ink and said second ink having different colors,
wherein an absolute value of a difference between a dynamic surface tension of a droplet of said second ink when deposited on said base member and a dynamic surface tension of a droplet of said first ink that has been deposited on a position adjacent to said droplet of said second ink when said droplet of said second ink is deposited on said base member is smaller than an absolute value of a difference between the dynamic surface tension of the droplet of said first ink that has been deposited on the position adjacent to said droplet of said second ink when said droplet of said second ink is deposited on said base member and the dynamic surface tension of the droplet of said first ink when deposited on said base member,
the droplet of said first ink that has been deposited on the position adjacent to said droplet of said second ink when said droplet of said second ink is deposited on said base member remains in the form of a liquid, and
said first ink and said second ink have approximately a same static surface tension.

2. The image forming apparatus according to claim 1, wherein
the dynamic surface tension of the droplet of said second ink when deposited on said base member is approximately equal to the dynamic surface tension of the droplet of said first ink that has been deposited on the position adjacent to said droplet of said second ink when said droplet of said second ink is deposited on said base member.

3. The image forming apparatus according to claim 2, wherein
said head unit is capable of changing a distance in said conveyance direction between said first ink ejection part and said second ink ejection part.

4. The image forming apparatus according to claim 1, further comprising:
a curing part that cures said first ink and said second ink on said base member by irradiation with radiation.

5. The image forming apparatus according to claim 4, wherein
said head unit is capable of changing a distance in said conveyance direction between said first ink ejection part and said second ink ejection part.

6. The image forming apparatus according to claim 4, wherein said curing part collectively cures said first ink and said second ink on said base member.

7. The image forming apparatus according to claim 1, wherein
said head unit is capable of changing a distance in said conveyance direction between said first ink ejection part and said second ink ejection part.

8. The image forming apparatus according to claim 1, wherein
said first ink ejection part and said second ink ejection part each have ejection ports arranged across an entire width of an image forming area of said base member, said width being orthogonal to said conveyance direction.

9. An image forming apparatus comprising:
a head unit that ejects a droplet of ink toward a base member;
a movement mechanism for moving said base member relative to said head unit; and
a control part,
wherein said head unit includes:
a first ink ejection part that ejects a first ink, a droplet of which when deposited on said base member has a surface tension that decreases with time; and
a second ink ejection part that ejects a second ink and that is provided downstream of said first ink ejection part in a conveyance direction in which said base member is conveyed relative to said head unit,
wherein an absolute value of a difference between a surface tension of a droplet of said second ink when deposited on said base member and a surface tension of a droplet of said first ink that has been deposited on a position adjacent to said droplet of said second ink when said droplet of said second ink is deposited on said base member is smaller than an absolute value of a difference between the surface tension of the droplet of said first ink that has been deposited on the position adjacent to said droplet of said second ink when said droplet of said second ink is deposited on said base member and the surface tension of the droplet of said first ink when deposited on said base member,
the droplet of said first ink that has been deposited on the position adjacent to said droplet of said second ink when said droplet of said second ink is deposited on said base member remains in the form of a liquid, and
said control part adjusts a movement speed at which said movement mechanism moves said base member relative to said head unit, to make substantially equal the surface tension of the droplet of said second ink when deposited on said base member and the surface tension of the droplet of said first ink that has been deposited on the position adjacent to said droplet of said second ink when said droplet of said second ink is deposited on said base member.

10. An image forming apparatus comprising:
a head unit that ejects a droplet of ink toward a base member;
a movement mechanism for moving said base member relative to said head unit; and
a control part,
wherein said head unit includes:
a first ink ejection part that ejects a first ink, a droplet of which when deposited on said base member has a surface tension that decreases with time; and
a second ink ejection part that ejects a second ink and that is provided downstream of said first ink ejection part in a conveyance direction in which said base member is conveyed relative to said head unit,
wherein an absolute value of a difference between a surface tension of a droplet of said second ink when deposited on said base member and a surface tension of a droplet of said first ink that has been deposited on a position adjacent to said droplet of said second ink when said droplet of said second ink is deposited on said base member is smaller than an absolute value of a difference between the surface tension of the droplet of said first ink that has been deposited on the position adjacent to said droplet of said second ink when said droplet of said second ink is deposited on said base member and the surface tension of the droplet of said first ink when deposited on said base member, the surface tension of the droplet of said second ink when deposited on said base member is approximately equal to the surface tension of the droplet of said first ink that has been deposited on the position adjacent to said droplet of said second ink when said droplet of said second ink is deposited on said base member, the droplet of said first ink that has been deposited on the position adjacent to said droplet of said second ink when said droplet of said second ink is deposited on said base member remains in the form of a liquid, and said control part adjusts a movement speed at which said movement mechanism moves said base member relative to said head unit, to make substantially equal the surface tension of the droplet of said second ink when deposited on said base member and the surface tension of the droplet of said first ink that has been deposited on the position adjacent to said droplet of said second ink when said droplet of said second ink is deposited on said base member.

11. An image forming apparatus comprising:
a head unit that ejects a droplet of ink toward a base member;
a movement mechanism for moving said base member relative to said head unit;
a curing part; and
a control part,
wherein said head unit includes:
a first ink ejection part that ejects a first ink, a droplet of which when deposited on said base member has a surface tension that decreases with time; and
a second ink ejection part that ejects a second ink and that is provided downstream of said first ink ejection part in a conveyance direction in which said base member is conveyed relative to said head unit,
wherein an absolute value of a difference between a surface tension of a droplet of said second ink when deposited on said base member and a surface tension of a droplet of said first ink that has been deposited on a position adjacent to said droplet of said second ink when said droplet of said second ink is deposited on said base member is smaller than an absolute value of a difference between the surface tension of the droplet of said first ink that has been deposited on the position adjacent to said droplet of said second ink when said droplet of said second ink is deposited on said base member and the surface tension of the droplet of said first ink when deposited on said base member, the droplet of said first ink that has been deposited on the position adjacent to said droplet of said second ink when said droplet of said second ink is deposited on said base member remains in the form of a liquid, said control part adjusts a movement speed at which said movement mechanism moves said base member relative to said head unit, to make substantially equal the surface tension of the droplet of said second ink when deposited on said base member and the surface tension of the droplet of said first ink that has been deposited on the position adjacent to said droplet of said second ink when said droplet of said second ink is deposited on said base member, and said curing part cures said first ink and said second ink on said base member by irradiation with radiation.

12. An image forming apparatus comprising:
a head unit that ejects a droplet of ink toward a base member;
a movement mechanism for moving said base member relative to said head unit; and
a control part,
wherein said head unit includes:
a first ink ejection part that ejects a first ink, a droplet of which when deposited on said base member has a surface tension that decreases with time; and
a second ink ejection part that ejects a second ink and that is provided downstream of said first ink ejection part in a conveyance direction in which said base member is conveyed relative to said head unit,
wherein said head unit is capable of changing a distance in said conveyance direction between said first ink ejection part and said second ink ejection part,
an absolute value of a difference between a surface tension of a droplet of said second ink when deposited on said base member and a surface tension of a droplet of said first ink that has been deposited on a position adjacent to said droplet of said second ink when said droplet of said second ink is deposited on said base member is smaller than an absolute value of a difference between the surface tension of the droplet of said first ink that has been deposited on the position adjacent to said droplet of said second ink when said droplet of said second ink is deposited on said base member and the surface tension of the droplet of said first ink when deposited on said base member, the droplet of said first ink that has been deposited on the position adjacent to said droplet of said second ink when said droplet of said second ink is deposited on said base member remains in the form of a liquid, and said control part adjusts a movement speed at which said movement mechanism moves said base member relative to said head unit, to make substantially equal the surface tension of the droplet of said second ink when deposited on said base member and the surface tension of the droplet of said first ink that has been deposited on the position adjacent to said droplet of said second ink when said droplet of said second ink is deposited on said base member.

* * * * *